US012366221B2

(12) United States Patent
Tamura et al.

(10) Patent No.: US 12,366,221 B2
(45) Date of Patent: Jul. 22, 2025

(54) FUEL INJECTION SYSTEM

(71) Applicant: KUBOTA CORPORATION, Osaka (JP)

(72) Inventors: Akira Tamura, Sakai (JP); Hiroki Oso, Sakai (JP); Naotaro Nagai, Sakai (JP); Shingo Matsunobu, Sakai (JP); Masanari Tennomi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/564,235

(22) PCT Filed: Feb. 21, 2022

(86) PCT No.: PCT/JP2022/007024
§ 371 (c)(1),
(2) Date: Nov. 27, 2023

(87) PCT Pub. No.: WO2022/270005
PCT Pub. Date: Dec. 29, 2022

(65) Prior Publication Data
US 2024/0254953 A1 Aug. 1, 2024

(30) Foreign Application Priority Data
Jun. 21, 2021 (JP) ................................ 2021-102755
Jun. 21, 2021 (JP) ................................ 2021-102758

(51) Int. Cl.
*F02M 61/14* (2006.01)

(52) U.S. Cl.
CPC ......... *F02M 61/14* (2013.01); *F02M 2200/40* (2013.01)

(58) Field of Classification Search
CPC .......................... F02M 61/14; F02M 2200/40
See application file for complete search history.

(56) References Cited

U.S. PATENT DOCUMENTS 6,178,950 B1 1/2001 Stockner et al.
7,406,946 B1 * 8/2008 Watanabe ........... F02M 55/005 123/456
(Continued)

FOREIGN PATENT DOCUMENTS

JP H06-081749 A 3/1994
JP 2009-293419 A 12/2009
(Continued)

*Primary Examiner* — Kurt Philip Liethen
(74) *Attorney, Agent, or Firm* — Muncy, Geissler, Olds & Lowe, P.C.

(57) ABSTRACT

An object of the present invention is to provide a fuel injection system capable of suppressing an occurrence of distortion in an injector during assembly of components. A fuel injection system (3) includes: a bracket (5) which is fixed to a cylinder head (21) of an engine (2); a fuel accumulator (6) which is supported by and fixed to the bracket (5) and which accumulates pressure of fuel supplied from a fuel pump; and an injector (7) which is directly connected to the fuel accumulator (6) and mounted to the cylinder head (21) and which injects the fuel, supplied from the fuel accumulator (6), into a combustion chamber. At least one of the fuel accumulator (6) and the bracket (5) has guide members (64, 513) which guide the injector (7) to a mount position on the cylinder head (21).

10 Claims, 6 Drawing Sheets

(56) References Cited

U.S. PATENT DOCUMENTS

| | | | | |
|---|---|---|---|---|
| 8,297,257 | B2 * | 10/2012 | Sugiyama ............ | F02M 61/168<br>123/456 |
| 9,316,142 | B2 * | 4/2016 | Inoue ........................ | F02B 1/02 |
| 9,745,938 | B2 | 8/2017 | Stahr et al. | |
| 10,641,222 | B2 * | 5/2020 | Serra ...................... | F02M 61/14 |
| 10,746,145 | B1 * | 8/2020 | Rondeau ................ | F02M 61/14 |
| 11,274,627 | B2 * | 3/2022 | Isoshima ................ | F02F 11/002 |
| 2001/0037783 | A1 * | 11/2001 | Fredriksson ......... | F02M 35/112<br>123/456 |
| 2012/0017875 | A1 | 1/2012 | Ishiki | |
| 2018/0003108 | A1 | 1/2018 | Fujimura | |

FOREIGN PATENT DOCUMENTS

| | | | |
|---|---|---|---|
| JP | 2010-255621 | A | 11/2010 |
| JP | 2012-026389 | A | 2/2012 |
| JP | 6468687 | B2 | 2/2019 |
| KR | 2001-0066425 | A | 7/2001 |

* cited by examiner

FUEL INJECTION SYSTEM

TECHNICAL FIELD

The present invention relates to a fuel injection system which injects fuel into a combustion chamber of an engine.

BACKGROUND ART

PTL 1 discloses an internal-combustion engine including a common rail. The common rail described in PTL 1 is fixed to a lower part of a head cover via two mounting portions integrally formed on a cylindrical body of the common rail and supplies an injector with high-pressure fuel. The injector described in PTL 1 is mounted on a cylinder head and injects the high-pressure fuel supplied from the common rail toward inside of the cylinder. In the internal-combustion engine described in PTL 1, the common rail and the injector are connected to each other by a fuel pipe.

By comparison, there is a fuel injection system in which an injector is directly connected to a common rail without involving a fuel pipe. In such a fuel injection system, when assembling components, e.g., the injector and the common rail, there is a risk that fixing the common rail to a head cover or a cylinder head or fixing the common rail to a support member referred to as a bracket that is fixed to the head cover or the cylinder head in a state where a position of the injector relative to the cylinder head is not determined may cause a flexural load or the like to be applied to the injector that is directly connected to the common rail. When a flexural load or the like is applied to the injector, there is a risk that distortion in the injector may occur.

When distortion in the injector occurs, an attitude of the injector may deviate from a designed attitude and may significantly impact a fuel injection amount. The fuel injection amount of the injector affects engine performance and exhaust performance. Therefore, the injector is desirably assembled in a state where the designed attitude is maintained.

One way to approach this issue is to assemble the components such as the injector and the common rail using a dedicated jig or a special tool to mount the injector to the cylinder head. However, the use of a dedicated jig or a special tool is problematic in that the number of steps in an assembly process of the components such as the injector and the common rail increases and that the dedicated jig or the special tool will be required during after-sales service and maintenance in the market.

In addition, when the common rail and the injector are connected to each other by a fuel pipe, there is a problem in that pressure loss of fuel occurs in the fuel pipe. Furthermore, arranging the fuel pipe problematically increases the number of components. Moreover, as described earlier, the common rail described in PTL 1 has two mounting portions that are integrally formed on a cylindrical body of the common rail and the common rail is fixed to a lower part of a head cover via the two mounting portions. Therefore, there is a problem in that a structure of the common rail becomes more complex or becomes larger. On the other hand, when the common rail does not have mounting portions, a member such as a bracket for fixing the common rail is necessary and the number of components increases. In addition, a member such as a bracket for fixing the injector may also become necessary.

By comparison, there is a fuel injection system in which an injector is directly connected to a common rail without involving a fuel pipe. Accordingly, the fuel pipe can be eliminated, an occurrence of a pressure loss of fuel can be suppressed, and the number of components can be reduced. However, in a fuel injection system in which an injector is directly connected to a common rail without involving a fuel pipe, depending on a fixing structure of the common rail and the injector, there is a risk that strength of the fuel injection system may decline and vibration and noise may become amplified.

CITATION LIST

Patent Literature

[PTL 1] Japanese Patent No. 6468687

SUMMARY OF INVENTION

Technical Problem

The present invention has been made in consideration of the circumstances described above and an object thereof is to provide a fuel injection system capable of suppressing an occurrence of distortion in an injector during assembly of components. In addition, the present invention has been made in consideration of the circumstances described above and an object thereof is to provide a fuel injection system capable of suppressing an occurrence of pressure loss of fuel, reducing the number of components, and reducing vibration and noise.

Solution to Problem

The problem described above is solved by a fuel injection system according to the present invention injecting fuel into a combustion chamber of an engine, the fuel injection system including: a bracket which is fixed to a cylinder head of the engine; a fuel accumulator which is supported by and fixed to the bracket and which accumulates pressure of the fuel supplied from a fuel pump; and an injector which is directly connected to the fuel accumulator and mounted to the cylinder head and which injects the fuel, supplied from the fuel accumulator, into the combustion chamber, wherein at least one of the fuel accumulator and the bracket has a guide member which guides the injector to a mount position on the cylinder head.

With the fuel injection system according to the present invention, the fuel accumulator which accumulates pressure of the fuel supplied from the fuel pump is supported by and fixed to the bracket which is fixed to the cylinder head of the engine. In addition, the injector which injects the fuel supplied from the fuel accumulator into the combustion chamber of the engine is directly connected to the fuel accumulator and also mounted to the cylinder head. In this case, at least one of the fuel accumulator and the bracket has a guide member which guides the injector to a mount position on the cylinder head. Therefore, when the fuel accumulator is assembled and fixed to the bracket, even in a state where a position of the injector relative to the cylinder head is not determined, the fuel accumulator guides the injector to the mount position on the cylinder head with the guide member while being assembled and fixed to the bracket. Accordingly, when the fuel accumulator is assembled and fixed to the bracket and when the injector is mounted to the cylinder head, the fuel injection system according to the present invention can prevent a flexural load or the like from being applied to the injector being connected to the fuel accumulator and an occurrence of distortion in the injector can be suppressed.

In addition, since the fuel accumulator guides the injector to the mount position on the cylinder head with the guide member while being assembled and fixed to the bracket, a dedicated jig and a special tool are not required. Accordingly, the fuel injection system according to the present invention can prevent the number of steps from increasing in an assembly process of the fuel accumulator with respect to the bracket and an assembly process of the injector with respect to the cylinder head. Furthermore, the fuel injection system according to the present invention can eliminate the need for a dedicated jig and a special tool during after-sales service and maintenance in the market.

In the fuel injection system according to the present invention, preferably, the guide member has a protruding portion provided on one of the fuel accumulator and the bracket and a recessed portion which is provided on the other of the fuel accumulator and the bracket and into which the protruding portion fits.

With the fuel injection system according to the present invention, due to the protruding portion fitting into the recessed portion, the guide member can more reliably guide the injector to the mount position on the cylinder head. In other words, when the fuel accumulator is assembled to the bracket and when the injector is mounted to the cylinder head, the guide member is used as an insertion guide. Therefore, when the fuel accumulator is assembled and fixed to the bracket, even in a state where a position of the injector relative to the cylinder head is not determined, the fuel accumulator can more reliably guide the injector to the mount position on the cylinder head with the guide member. Accordingly, when the fuel accumulator is assembled and fixed to the bracket and when the injector is mounted to the cylinder head, the fuel injection system according to the present invention can further prevent a flexural load or the like from being applied to the injector being connected to the fuel accumulator and an occurrence of distortion in the injector can be further suppressed.

In the fuel injection system according to the present invention, preferably, the injector is mounted to the cylinder head by being inserted into an insertion hole formed in the cylinder head, and a direction in which the protruding portion fits into the recessed portion is parallel to a direction of insertion of the injector into to the insertion hole.

With the fuel injection system according to the present invention, the direction in which the protruding portion fits into the recessed portion is parallel to the insertion direction of the injector relative to the insertion hole. Therefore, a direction in which the fuel accumulator is assembled and fixed to the bracket is parallel to the insertion direction of the injector relative to the insertion hole. As a result, the fuel accumulator proceeds parallel to the direction of insertion of the injector into the injector and is assembled and fixed to the bracket while guiding the injector to the mount position on the cylinder head with the guide member. Accordingly, when the fuel accumulator is assembled and fixed to the bracket and when the injector is mounted to the cylinder head, the fuel injection system according to the present invention can further prevent a flexural load or the like from being applied to the injector being connected to the fuel accumulator and an occurrence of distortion in the injector can be further suppressed.

In the fuel injection system according to the present invention, preferably, the guide member has the protruding portion in plurality and the recessed portion in plurality such that each of the plurality of recessed portions is fitted by each of the plurality of protruding portions.

With the fuel injection system according to the present invention, the guide member has a plurality of the protruding portions and a plurality of the recessed portions. Each of the plurality of protruding portions fits into each of the plurality of recessed portions. Therefore, when the fuel accumulator is assembled to the bracket and when the injector is mounted to the cylinder head, the guide member is used as an insertion guide at a plurality of positions. As a result, the fuel accumulator is assembled and fixed to the bracket while guiding the injector to the mount position on the cylinder head at a plurality of positions with the guide member. Accordingly, the fuel injection system according to the present invention can further prevent a flexural load or the like from being applied to the injector being connected to the fuel accumulator and an occurrence of distortion in the injector can be further suppressed without using a dedicated jig and a special tool.

In the fuel injection system according to the present invention, preferably, when the injector is mounted to the cylinder head, the protruding portion starts to fit into the recessed portion before a position of the injector relative to the cylinder head is determined.

With the fuel injection system according to the present invention, when the injector is mounted to the cylinder head, the guide member can start guiding the injector to the mount position on the cylinder head before the position of the injector relative to the cylinder head is determined. Accordingly, when the fuel accumulator is assembled and fixed to the bracket and when the injector is mounted to the cylinder head, the fuel injection system according to the present invention can further prevent a flexural load or the like from being applied to the injector being connected to the fuel accumulator and an occurrence of distortion in the injector can be further suppressed.

In the fuel injection system according to the present invention, preferably, the fuel accumulator is fixed to the bracket by using first fastening members, the bracket is fixed to the cylinder head by using second fastening members, the bracket has first fixing portions which mesh with the first fastening members, second fixing portions each having a hole through which each of the second fastening members passes, and a reinforcing portion which connects and reinforces the first fixing portion and the second fixing portion that are adjacent to each other, and the bracket is formed in a ladder shape or a grid shape.

With the fuel injection system according to the present invention, the fuel accumulator is fixed to the bracket by using first fastening members. The bracket is fixed to the cylinder head by using second fastening members. In addition, the bracket has first fixing portions which mesh with the first fastening members, second fixing portions each having a hole through which each of the second fastening members passes, and a reinforcing portion which connects and reinforces the first fixing portion and the second fixing portion that are adjacent to each other, and the bracket is formed in a ladder shape or a grid shape. Accordingly, the fuel injection system according to the present invention can achieve a reduction in the number of components while reinforcing a fixing structure of the fuel accumulator and the injector using the bracket being formed in a ladder shape or a grid shape.

The problem described above is solved by a fuel injection system according to the present invention injecting fuel into a combustion chamber of an engine, the fuel injection system including: a bracket which is fixed to a cylinder head of the engine; a fuel accumulator which is supported by and fixed to the bracket and which accumulates pressure of the fuel supplied from a fuel pump; and an injector which is directly connected to the fuel accumulator and mounted to the cylinder head and which injects the fuel, supplied from the fuel accumulator, into the combustion chamber, wherein the fuel accumulator is fixed to the bracket by using first fastening members, the bracket is fixed to the cylinder head by using second fastening members, the bracket has first fixing portions which mesh with the first fastening members, second fixing portions each having a hole through which each of the second fastening members passes, and a reinforcing portion which connects and reinforces the first fixing portion and the second fixing portion that are adjacent to each other, and the bracket is formed in a ladder shape or a grid shape.

With the fuel injection system according to the present invention, the fuel accumulator which accumulates pressure of the fuel supplied from the fuel pump is supported by and fixed to the bracket which is fixed to the cylinder head of the engine. In addition, the injector which injects the fuel, supplied from the fuel accumulator, into the combustion chamber of the engine is directly connected to the fuel accumulator and also mounted to the cylinder head. In this manner, since the injector is directly connected to the fuel accumulator, an occurrence of pressure loss of fuel is suppressed and the number of components including a fuel pipe and a bracket for fixing the injector can be reduced.

In this case, the fuel accumulator is fixed to the bracket using first fastening members. The bracket is fixed to the cylinder head using second fastening members. In addition, the bracket which supports the fuel accumulator to which the injector is directly connected has first fixing portions which mesh with the first fastening members, second fixing portions each having a hole through which each of the second fastening members passes, and a reinforcing portion which connects and reinforces the first fixing portion and the second fixing portion that are adjacent to each other, and the bracket is formed in a ladder shape or a grid shape. Accordingly, the fuel injection system according to the present invention can reinforce a fixing structure of the fuel accumulator and the injector using the bracket being formed in a ladder shape or a grid shape. Since strength of the fixing structure of the fuel accumulator and the injector is increased by the bracket being formed in a ladder shape or a grid shape, vibration that occurs in the fuel injection system can be reduced. In addition, since the vibration that occurs in the fuel injection system can be reduced, noise that occurs in the fuel injection system can be reduced. Accordingly, the fuel injection system according to the present invention can suppress an occurrence of pressure loss of fuel, reduce the number of components, and reduce vibration and noise.

In the fuel injection system according to the present invention, preferably, the reinforcing portion is a first reinforcing portion, and the bracket further includes a second reinforcing portion which connects and reinforces the first fixing portions that are adjacent to each other and a third reinforcing portion which connects and reinforces the second fixing portions that are adjacent to each other.

With the fuel injection system according to the present invention, the bracket has a first reinforcing portion which connects and reinforces one of the first fixing portions and one of the second fixing portions that are adjacent to each other, a second reinforcing portion which connects and reinforces the first fixing portions that are adjacent to each other, and a third reinforcing portion which connects and reinforces the second fixing portions that are adjacent to each other, and the bracket is formed in a ladder shape or a grid shape. Therefore, strength of the fixing structure of the fuel accumulator and the injector is further increased. As a result, the vibration that occurs in the fuel injection system can be further reduced. In addition, since the vibration that occurs in the fuel injection system can be further reduced, noise that occurs in the fuel injection system can be further reduced. Accordingly, the fuel injection system according to the present invention can suppress an occurrence of pressure loss of fuel, reduce the number of components, and further reduce vibration and noise.

In the fuel injection system according to the present invention, preferably, the first fastening members pass through, from above, holes formed in the fuel accumulator and mesh with the first fixing portions, and the second fastening members pass through, from above, the holes formed in the second fixing portions and mesh with the cylinder head.

With the fuel injection system according to the present invention, the first fastening members pass through, from above, holes formed in the fuel accumulator and mesh with the first fixing portions of the bracket. The second fastening members pass through, from above, the holes formed in the second fixing portions of the bracket and mesh with the cylinder head. Therefore, when carrying out work to assemble and fix the bracket to the cylinder head, a worker can pass the second fastening members through the holes formed in the second fixing portions of the bracket from above and cause the second fastening members to mesh with the cylinder head and readily fasten the bracket to the cylinder head. In addition, when carrying out work to assemble and fix the fuel accumulator to which the injector is directly connected to the bracket, the worker can pass the first fastening members through holes formed in the fuel accumulator from above and cause the first fastening members to mesh with the first fixing portions of the bracket and readily fasten the fuel accumulator to which the injector is directly connected to the bracket. Accordingly, the fuel injection system according to the present invention can facilitate assemblability and improve workability.

In the fuel injection system according to the present invention, preferably, a fastening surface which comes into contact with the bracket and which is fastened in the fuel accumulator is a same surface as a positioning surface which comes into contact with the injector and which determines a position of the injector in the fuel accumulator.

With the fuel injection system according to the present invention, a fastening surface which comes into contact with the bracket and which is fastened among the fuel accumulator is a same surface as a positioning surface which comes into contact with the injector and which determines a position of the injector among the fuel accumulator. Accordingly, the fuel injection system according to the present invention can facilitate assemblability, improve workability, and fix the fuel accumulator to which the injector is directly connected to the bracket in a stable manner.

In the fuel injection system according to the present invention, preferably, at least one of the fuel accumulator and the bracket has a guide member which guides the injector to a mount position on the cylinder head.

With the fuel injection system according to the present invention, at least one of the fuel accumulator and the bracket has a guide member which guides the injector to a mount position on the cylinder head. Therefore, when the fuel accumulator is assembled and fixed to the bracket, even in a state where a position of the injector relative to the cylinder head is not determined, the fuel accumulator guides the injector to the mount position on the cylinder head with the guide member while being assembled and fixed to the bracket. Accordingly, when the fuel accumulator is assembled and fixed to the bracket and when the injector is mounted to the cylinder head, the fuel injection system according to the present invention can prevent a flexural load or the like from being applied to the injector being connected to the fuel accumulator and an occurrence of distortion in the injector can be suppressed.

In addition, since the fuel accumulator guides the injector to the mount position on the cylinder head with the guide member while being assembled and fixed to the bracket, a dedicated jig and a special tool are not required. Accordingly, the fuel injection system according to the present invention can prevent the number of steps from increasing in an assembly process of the fuel accumulator with respect to the bracket and an assembly process of the injector with respect to the cylinder head. Furthermore, the fuel injection system according to the present invention can eliminate the need for a dedicated jig and a special tool during after-sales service and maintenance in the market.

In the fuel injection system according to the present invention, preferably, the guide member has a protruding portion provided on one of the fuel accumulator and the bracket and a recessed portion which is provided on the other of the fuel accumulator and the bracket and in which the protruding portion fits.

With the fuel injection system according to the present invention, due to the protruding portion fitting into the recessed portion, the guide member can more reliably guide the injector to the mount position on the cylinder head. In other words, when the fuel accumulator is assembled to the bracket and when the injector is mounted to the cylinder head, the guide member is used as an insertion guide. Therefore, when the fuel accumulator is assembled and fixed to the bracket, even in a state where a position of the injector relative to the cylinder head is not determined, the fuel accumulator can more reliably guide the injector to the mount position on the cylinder head with the guide member. Accordingly, when the fuel accumulator is assembled and fixed to the bracket and when the injector is mounted to the cylinder head, the fuel injection system according to the present invention can further prevent a flexural load or the like from being applied to the injector being connected to the fuel accumulator and an occurrence of distortion in the injector can be further suppressed.

In the fuel injection system according to the present invention, preferably, the injector is mounted to the cylinder head by being inserted into an insertion hole formed in the cylinder head, and a direction in which the protruding portion fits into the recessed portion is parallel to a direction of insertion of the injector into the insertion hole.

With the fuel injection system according to the present invention, the direction in which the protruding portion fits into the recessed portion is parallel to the direction of insertion of the injector into the insertion hole. Therefore, a direction in which the fuel accumulator is assembled and fixed to the bracket is parallel to the insertion direction of the injector relative to the insertion hole. As a result, the fuel accumulator proceeds parallel to the insertion direction of the injector relative to the injector and is assembled and fixed to the bracket while guiding the injector to the mount position on the cylinder head with the guide member. Accordingly, when the fuel accumulator is assembled and fixed to the bracket and when the injector is mounted to the cylinder head, the fuel injection system according to the present invention can further prevent a flexural load or the like from being applied to the injector being connected to the fuel accumulator and an occurrence of distortion in the injector can be further suppressed.

In the fuel injection system according to the present invention, preferably, the cylinder head has a sleeve which is press-fitted into the insertion hole and which determines a position of insertion of the injector into the insertion hole.

With the fuel injection system according to the present invention, a sleeve which determines a position of insertion of the injector into the insertion hole to which the injector is to be inserted is press-fitted into the insertion hole before the insertion of the injector. Therefore, the sleeve can more reliably determine a position of the injector and, at the same time, suppress a rotation of the sleeve itself in the insertion hole. Accordingly, the fuel injection system according to the present invention can improve durability and reliability of the injector.

In the fuel injection system according to the present invention, preferably, the guide member has the protruding portion in plurality and the recessed portion in plurality such that each of the plurality of recessed portions is fitted by each of the plurality of protruding portions.

With the fuel injection system according to the present invention, the guide member has a plurality of the protruding portions and a plurality of the recessed portions. Each of the plurality of protruding portions fits into each of the plurality of recessed portions. Therefore, when the fuel accumulator is assembled to the bracket and when the injector is mounted to the cylinder head, the guide member is used as an insertion guide at a plurality of positions. As a result, the fuel accumulator is assembled and fixed to the bracket while guiding the injector to the mount position on the cylinder head at a plurality of positions with the guide member. Accordingly, the fuel injection system according to the present invention can further prevent a flexural load or the like from being applied to the injector being connected to the fuel accumulator and an occurrence of distortion in the injector can be further suppressed without using a dedicated jig and a special tool.

In the fuel injection system according to the present invention, preferably, when the injector is mounted to the cylinder head, the protruding portion starts to fit into the recessed portion before a position of the injector relative to the cylinder head is determined.

With the fuel injection system according to the present invention, when the injector is mounted to the cylinder head, the guide member can start guiding the injector to the mount position on the cylinder head before the position of the injector relative to the cylinder head is determined. Accordingly, when the fuel accumulator is assembled and fixed to the bracket and when the injector is mounted to the cylinder head, the fuel injection system according to the present invention can further prevent a flexural load or the like from being applied to the injector being connected to the fuel accumulator and an occurrence of distortion in the injector can be further suppressed.

Advantageous Effects of Invention

According to the present invention, a fuel injection system capable of suppressing an occurrence of distortion in an injector during assembly of components can be provided. In addition, according to the present invention, a fuel injection system capable of suppressing an occurrence of pressure loss of fuel, reducing the number of components, and reducing vibration and noise can be provided.

DESCRIPTION OF EMBODIMENT

Figure 1:
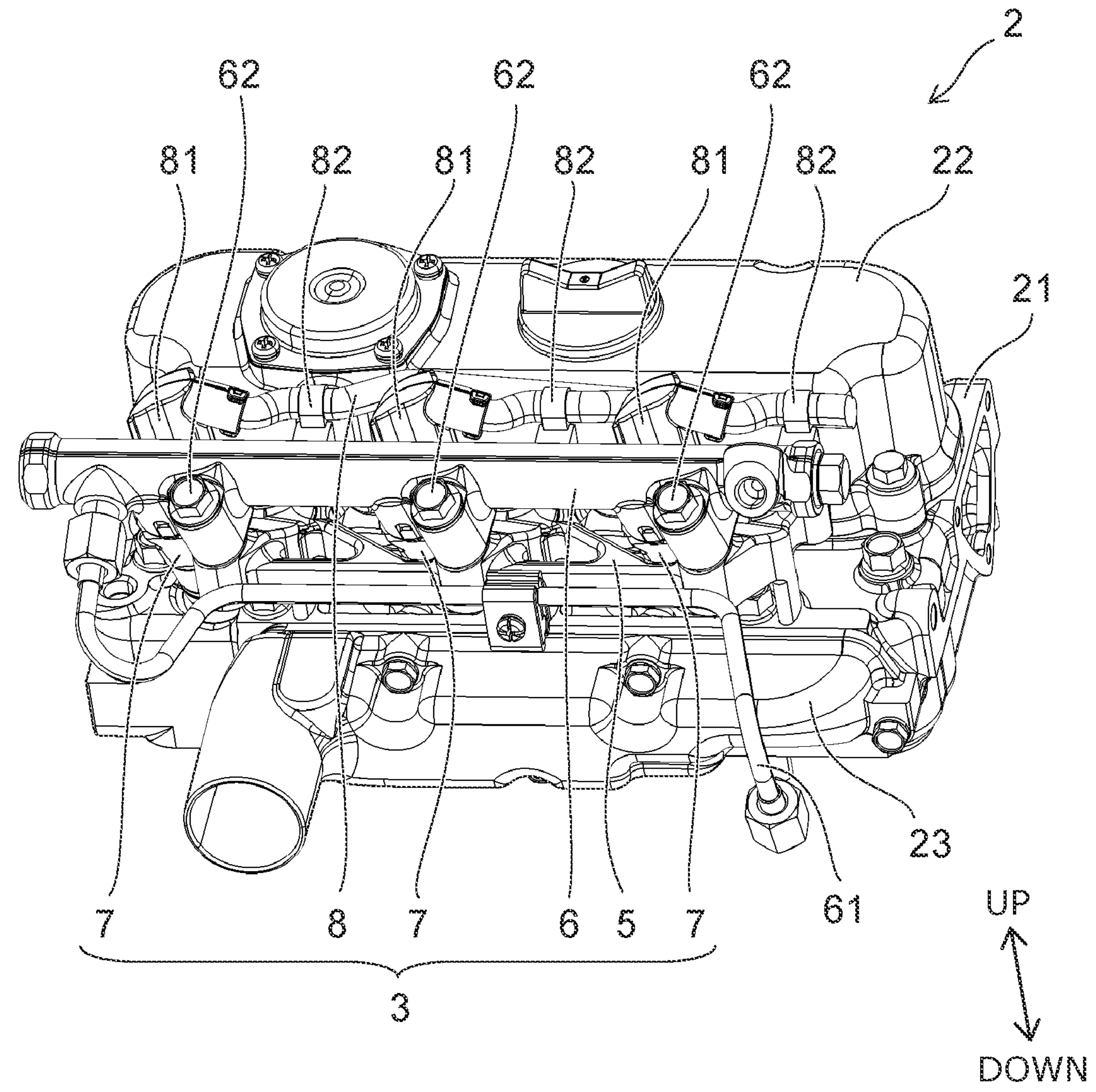
FIG. 1 is a perspective view representing an engine equipped with a fuel injection system according to the present invention.

Hereinafter, a preferred embodiment of the present invention will be described in detail with reference to drawings.

Although the embodiment described below is a preferred specific example of the present invention and may therefore be subject to various technically preferable limitations, the scope of the present invention is not limited to such aspects unless a description that specifically limits the present invention is provided below. In addition, similar components in the drawings will be denoted by same reference signs and detailed descriptions will be omitted when appropriate to do so.

FIG. 1 is a perspective view representing an engine equipped with a fuel injection system according to the present invention.

Figure 2:
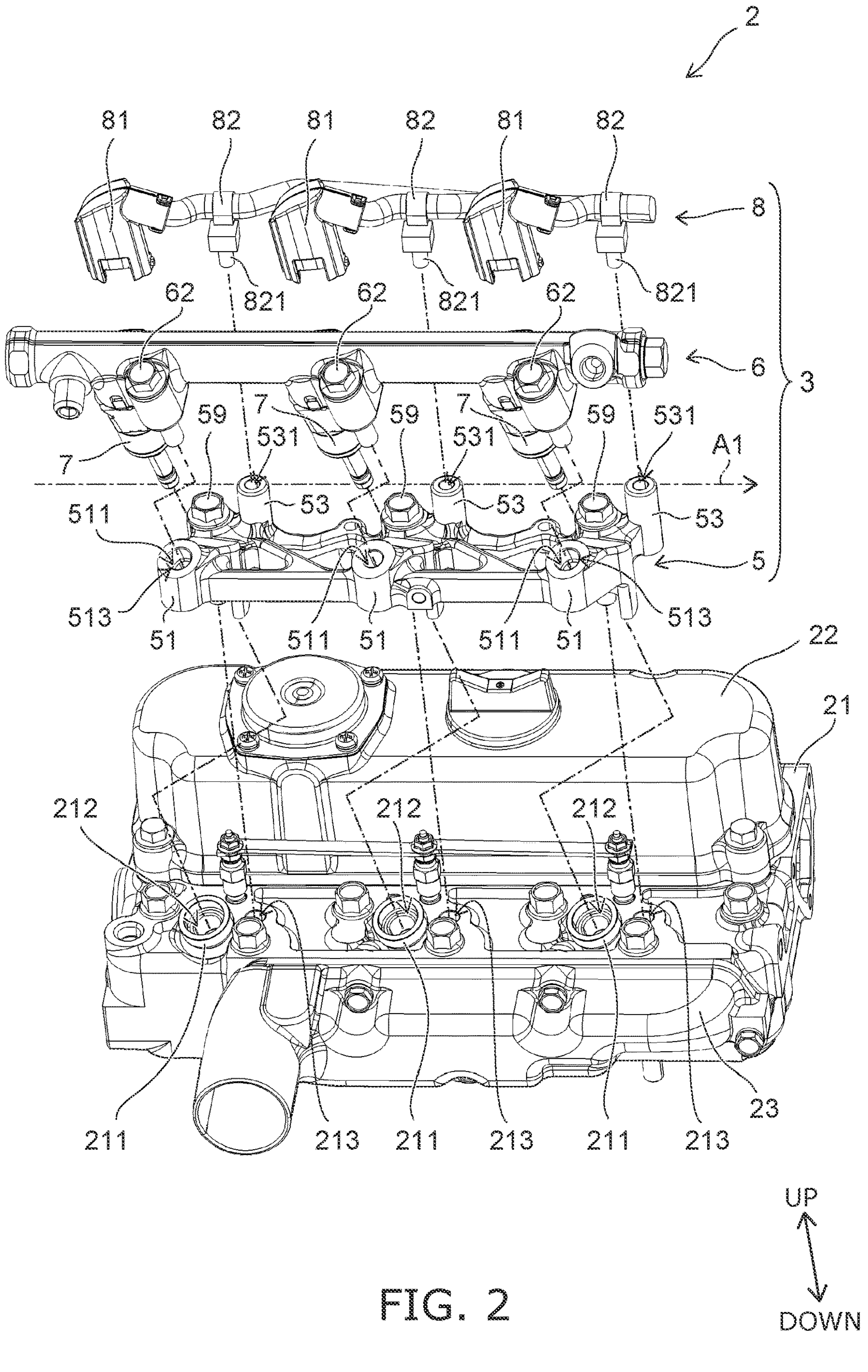
FIG. 2 is an exploded view representing an engine equipped with a fuel injection system according to the present embodiment.

FIG. 2 is an exploded view representing an engine equipped with a fuel injection system according to the present embodiment.

In FIGS. 1 and 2, for convenience of description, components (such as a cylinder block and a crankcase) provided below a cylinder head of the engine have been omitted. In addition, in FIG. 2, a fuel pipe 61 has been omitted for convenience of description.

An engine 2 represented in FIGS. 1 and 2 is, for example, an industrial diesel engine mounted to industrial machinery such as a construction machine, an agricultural machine, and a lawn mower. The engine 2 is a straight multiple cylinder engine and, in the example represented in FIGS. 1 and 2, the engine 2 is a straight three-cylinder engine. For example, the engine 2 is an indirect injection (IDI) diesel engine. However, the engine 2 according to the present embodiment is not limited to a straight three-cylinder engine. In addition, the engine 2 according to the present embodiment is not limited to an indirect injection diesel engine.

The engine 2 is equipped with a cylinder head 21, a head cover 22, an intake manifold 23, and a fuel injection system 3. The fuel injection system 3 is provided in an upper part of the cylinder head 21. Note that in the present specification, it is assumed that an up-down direction corresponds to an up-down direction of industrial machinery such as a construction machine, an agricultural machine, and a lawn mower in a state where the engine 2 is mounted to the industrial machinery.

The fuel injection system 3 according to the present embodiment is equipped with a bracket 5, a fuel accumulator 6, an injector 7, and a harness 8.

The bracket 5 is fixed to an upper part of the cylinder head 21 using a plurality of second fastening members 59. In the fuel injection system 3 according to the present embodiment, the bracket 5 is fixed to the cylinder head 21 using three second fastening members 59. Specifically, the second fastening members 59 pass through holes 521 (refer to FIG. 5) formed in second fixing portions 52 (refer to FIG. 5) of the bracket 5 from above to below and mesh with female screws 213 formed in the upper part of the cylinder head 21. Accordingly, the bracket 5 is fastened to the cylinder head 21 using the plurality of second fastening members 59. Details of the bracket 5 will be provided later.

The fuel accumulator 6 is a so-called common rail type fuel injection apparatus and accumulates, in a common rail, pressure of fuel having been boosted by a fuel pump (not illustrated) and supplied through the fuel pipe 61. The fuel accumulator 6 is fixed to the bracket 5 using a plurality of first fastening members 62. In the fuel injection system 3 according to the present embodiment, the fuel accumulator 6 is fixed to the bracket 5 using three first fastening members 62. Specifically, the first fastening member 62 pass through holes 63 (refer to FIG. 9) provided in the fuel accumulator 6 from above to below and mesh with female screws 511 formed in the first fixing portions 51 of the bracket 5. Accordingly, the fuel accumulator 6 is fastened to the bracket 5 using the plurality of first fastening members 62. In the bracket 5 represented in FIG. 2, a recessed portion 513 is formed in an upper part of the female screw 511 in two first fixing portions 51 at both ends among the three first fixing portions 51. Details of the recessed portion 513 will be provided later.

As represented in FIG. 2, the injector 7 is directly connected to the fuel accumulator 6. As described earlier, the engine 2 represented in FIGS. 1 and 2 is a straight three-cylinder engine. Therefore, in the fuel injection system 3 according to the present embodiment, three injectors 7 are directly connected to the fuel accumulator 6 and are arranged so as to line up along an array direction A1. In addition, each of the injectors 7 is mounted to the cylinder head 21. Specifically, as represented in FIG. 2, a lower part of each injector 7 is inserted into an insertion hole 212 formed in the cylinder head 21. In the engine 2 represented in FIG. 2, a sleeve 211 is press-fitted into the insertion hole 212 and fixed to the cylinder head 21. Therefore, in the engine 2 represented in FIG. 2, a hole provided in the sleeve 211 forms a part of the insertion hole 212. The sleeve 211 determines an insertion position of the injector 7 relative to the insertion hole 212. Note that the sleeve 211 need not necessarily be provided.

Figure 7:
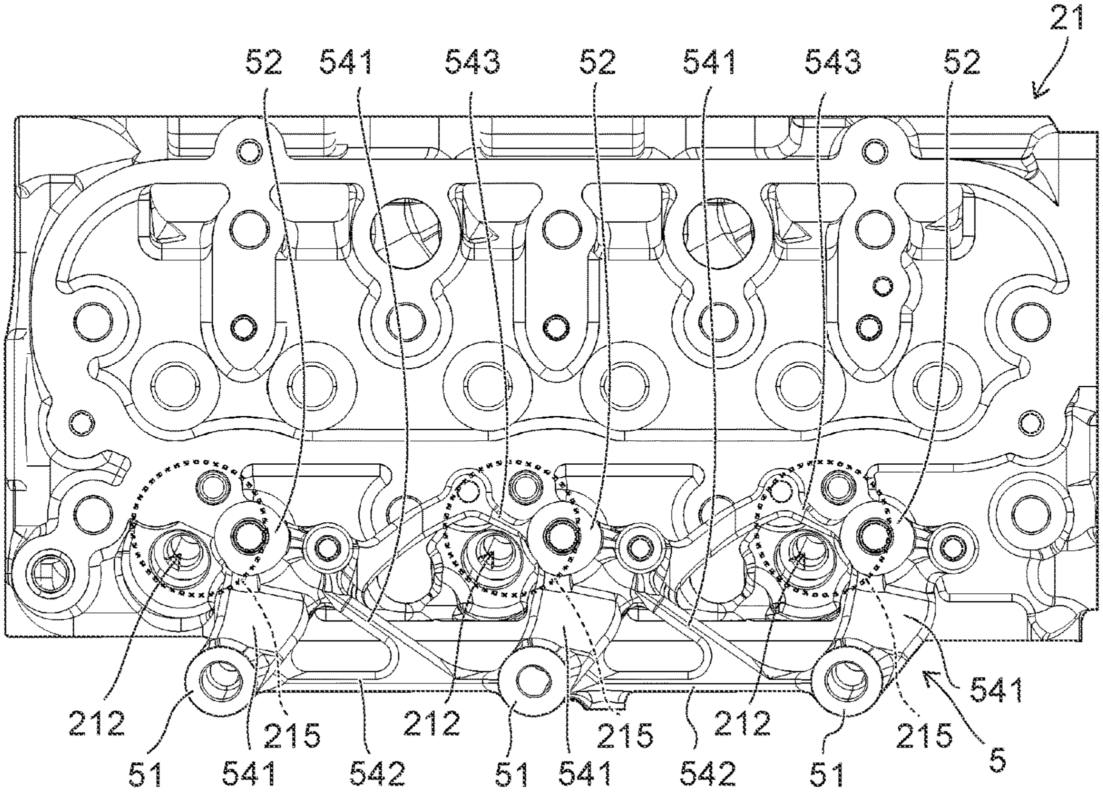
FIG. 7 is a top view representing an arrangement relationship between the bracket and a cylinder head according to the present embodiment.
Figure 8:
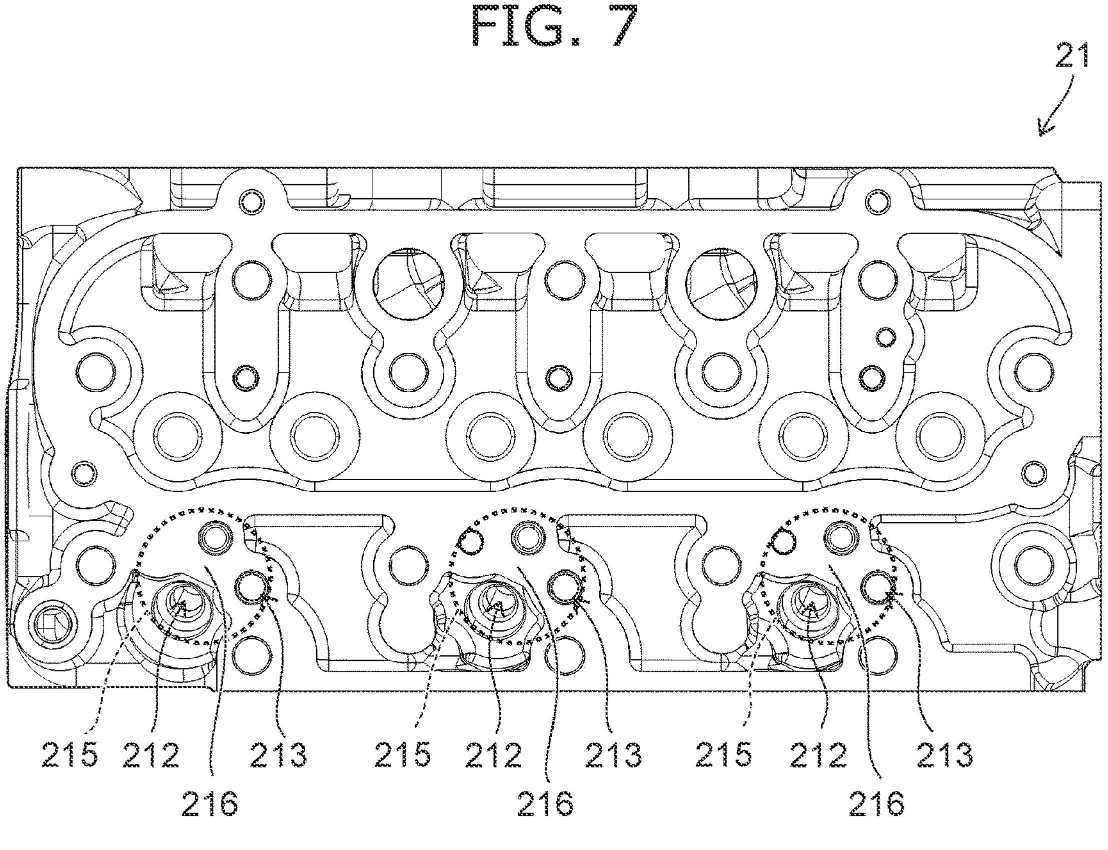
FIG. 8 is a top view representing the cylinder head according to the present embodiment.

The harness 8 is connected to the injector 7 in a connecting portion 81 that is referred to as a coupler or the like and supplies the injector 7 with power. For example, the injector 7 opens a needle valve using power which is controlled by an electronic control unit (ECU) based on a detection signal related to the number of revolutions of the engine, a detection signal related to an accelerator position, or the like and which is supplied via the harness 8, and injects fuel supplied from the fuel accumulator 6 into a combustion chamber 215 (refer to FIGS. 7 and 8) of the engine 2. For example, the combustion chamber 215 represented in FIGS. 7 and 8 is an auxiliary chamber (in other words, an auxiliary combustion chamber) provided in the cylinder head 21. However, the combustion chamber into which the injector 7 according to the present embodiment injects fuel is not limited to an auxiliary chamber. In this manner, the harness 8 is a harness for driving the injector 7 or, in other words, an injector-driving harness.

The harness 8 is held by a holding member 82 and fixed to the bracket 5 via the holding member 82. Specifically, as represented in FIGS. 1 and 2, the holding member 82 holds the harness 8 and, due to a projecting portion 821 of the holding member 82 being inserted into a hole 531 formed in a third fixing portion 53 of the bracket 5, the holding member 82 is mounted to the bracket 5. Accordingly, the harness 8 is fixed to the bracket 5 via the holding member 82. Examples of the holding member 82 include a banding band which is attached to an outer periphery of the harness 8 and which holds the harness 8. However, the harness 8 is not limited to a banding band.

Figure 3:
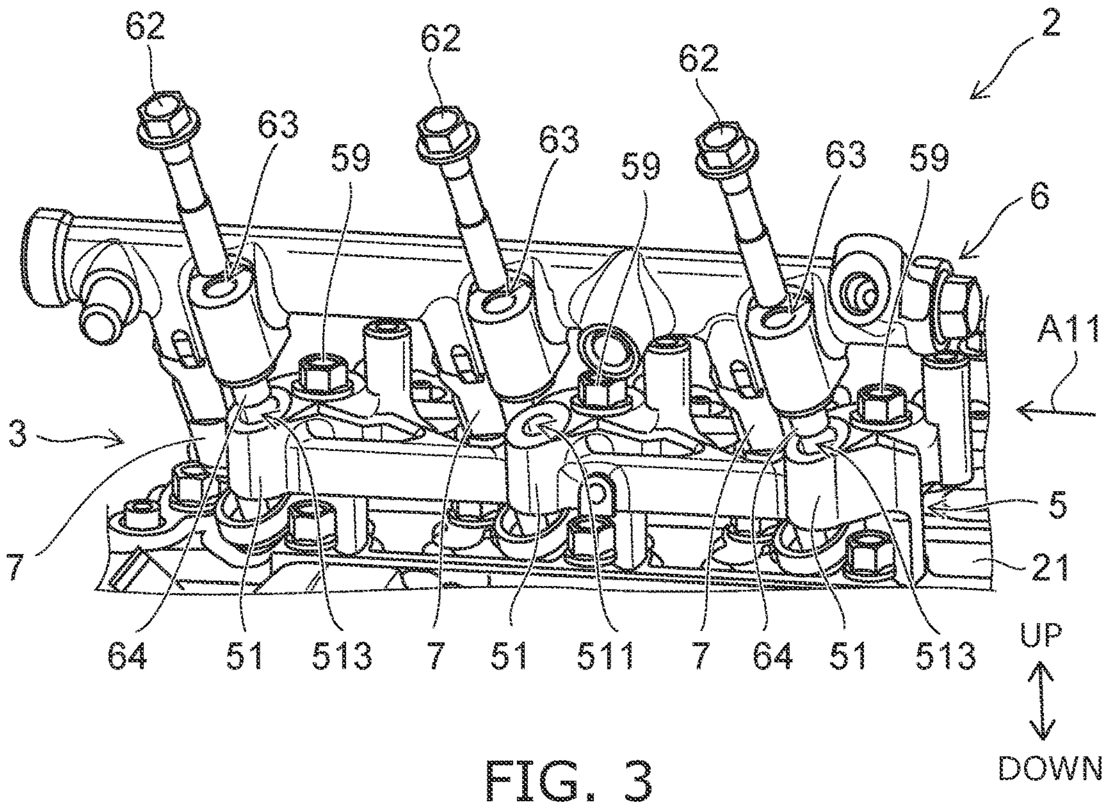
FIG. 3 is a perspective view enlarging and representing the fuel injection system according to the present embodiment.

FIG. 3 is a perspective view enlarging and representing the fuel injection system according to the present embodiment.

Figure 4:
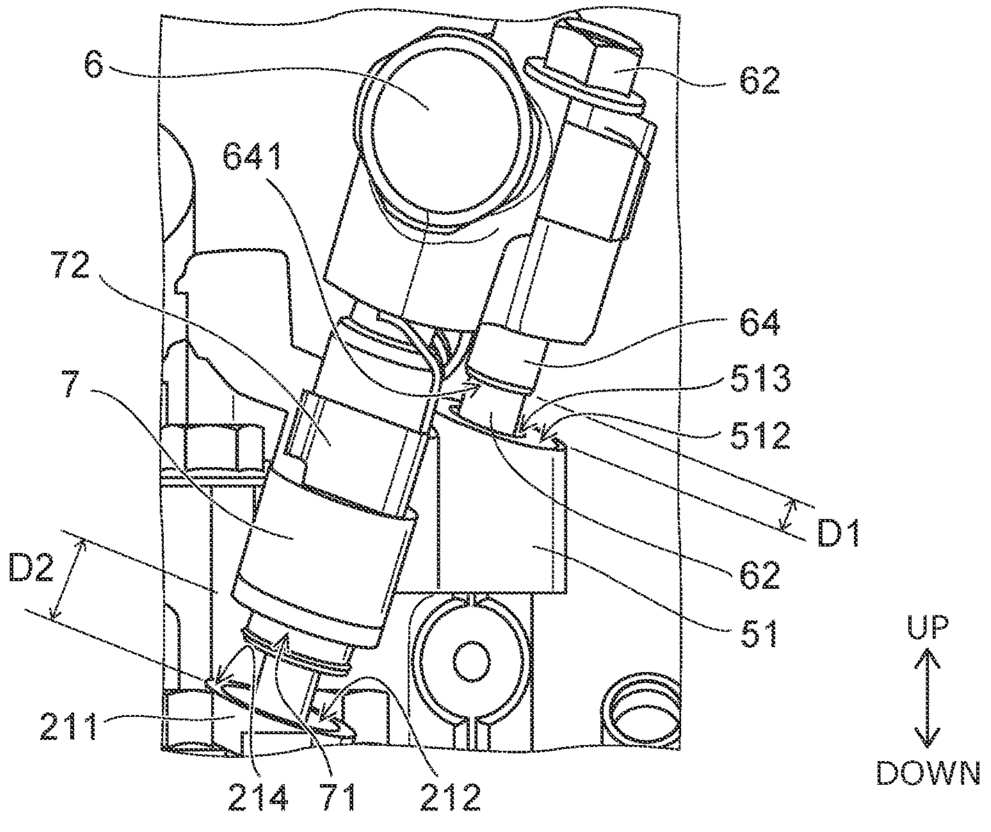
FIG. 4 is a plan view when viewing the fuel injection system according to the present embodiment in a direction of an arrow A11 represented in FIG. 3.

FIG. 4 is a plan view when viewing the fuel injection system according to the present embodiment in a direction of an arrow A11 represented in FIG. 3.

Figure 5:
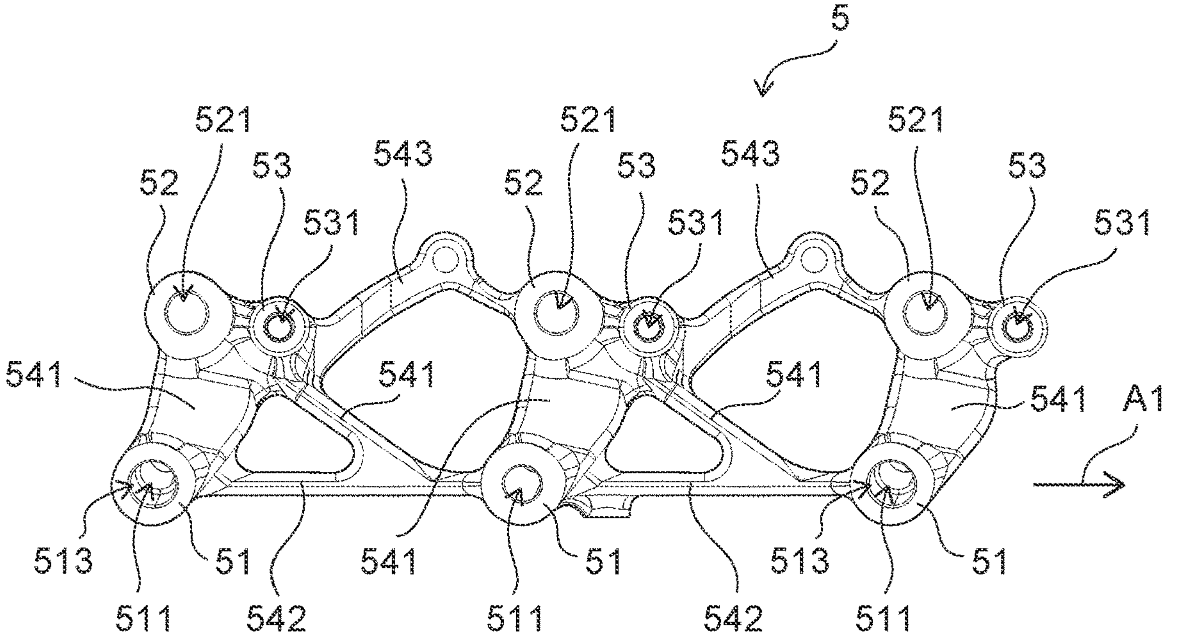
FIG. 5 is a plan view representing a bracket according to the present embodiment.

FIG. 5 is a plan view representing the bracket according to the present embodiment.

First, details of the bracket according to the present embodiment will be described with reference to FIG. 5.

As represented in FIG. 5, the bracket 5 according to the present embodiment is formed in a ladder shape or a grid shape. Specifically, the bracket 5 has a first fixing portion 51, a second fixing portion 52, a third fixing portion 53, a first reinforcing portion 541, a second reinforcing portion 542, and a third reinforcing portion 543.

The first fixing portion 51 has a female screw 511 which meshes with a male screw of the first fastening member 62. As represented in FIG. 5, the bracket 5 according to the present embodiment has three first fixing portions 51. The three first fixing portions 51 are arranged so as to be lined up along the array direction A1 of the three injectors 7. As represented in FIG. 5, the recessed portion 513 is formed in an upper part of the female screw 511 in two first fixing portions 51 at both ends among the three first fixing portions 51. The recessed portion 513 constitutes a part of the "guide member" according to the present invention and has an inner circumferential surface that is parallel to an insertion direction of the injector 7 and a direction of forward movement of the first fastening member 62. In other words, an axis of the recessed portion 513 is parallel to the insertion direction of the injector 7 and the direction of forward movement of the first fastening member 62.

Note that the recessed portion 513 is not limited to being formed in the two first fixing portions 51 at both ends among the three first fixing portions 51 and need only be formed so as to correspond to a protruding portion 64 (refer to FIG. 3). For example, the recessed portion 513 may be formed in an upper part of the female screw 511 in all three first fixing portions 51. In addition, in order to further improve guiding accuracy and positioning accuracy in a horizontal direction, the recessed portion 513 is desirably formed in at least two first fixing portions 51 among the three first fixing portions 51. For example, the recessed portion 513 may be formed in an upper part of the female screw 511 in the central first fixing portion 51 and any of the first fixing portions 51 at both ends among the three first fixing portions 51. Furthermore, the recessed portion 513 need only be formed so as to correspond to the protruding portion 64 and need not necessarily be formed in the upper part of the female screw 511 and need not be formed coaxially with an axis of the female screw 511.

The second fixing portion 52 has a hole 521 which, for example, a male screw of the second fastening member 59 can pass through. As represented in FIG. 5, the bracket 5 according to the present embodiment has three second fixing portions 52. The three second fixing portions 52 are arranged so as to be lined up along the array direction A1 of the three injectors 7 and arranged so as to be separated from the three first fixing portions 51 in a direction that intersects with the array direction A1 of the three injectors 7.

The third fixing portion 53 has a hole 531 into which the projecting portion 821 of the holding member 82 can be inserted. As represented in FIG. 5, the bracket 5 according to the present embodiment has three third fixing portions 53. The three third fixing portions 53 are arranged so as to be lined up along the array direction A1 of the three injectors 7 and arranged so as to be separated from the three first fixing portions 51 in a direction that intersects with the array direction A1 of the three injectors 7. In addition, the third fixing portions 53 are provided in a vicinity of the second fixing portions 52.

The first reinforcing portion 541 connects one of the first fixing portions 51 and one of the second fixing portions 52 that are adjacent to each other to reinforce the bracket 5. The second reinforcing portion 542 connects the first fixing portions 51 that are adjacent to each other to reinforce the bracket 5. The third reinforcing portion 543 connects the second fixing portions 52 that are adjacent to each other to reinforce the bracket 5.

The bracket 5 according to the present embodiment is structured as described above and is formed in a ladder shape or a grid shape.

Next, assembly of the bracket 5 and the fuel accumulator 6 will be described with reference to FIGS. 3 and 4.

As described earlier regarding FIGS. 1 and 2, the injector 7 according to the present embodiment is directly connected to the fuel accumulator 6. As represented in FIGS. 3 and 4, when the fuel accumulator 6 is fastened to the bracket 5 using the first fastening member 62, the injector 7 is held in advance in an insertion hole 66 (refer to FIG. 9) of the fuel accumulator 6 by, for example, an O ring (not illustrated) mounted to the injector 7.

As represented in FIG. 4, a biasing member 72 such as a leaf spring is attached to the injector 7. In a state where the injector 7 is mounted to the cylinder head 21 (refer to FIGS. 1 and 2), the biasing member 72 imparts a biasing force to the fuel accumulator 6 and the cylinder head 21. As represented in FIG. 4, in a state where the injector 7 is being held in the insertion hole 66 of the fuel accumulator 6 before the injector 7 is mounted to the cylinder head 21, the injector 7 is in a state of being slightly levitated from the fuel accumulator 6. In other words, a position of the injector 7 relative to the fuel accumulator 6 is not determined. In addition, a position of the injector 7 relative to the cylinder head 21 is also not determined. Subsequently, when the fuel accumulator 6 is fastened to the bracket 5 using first fastening members 62, the injector 7 is sandwiched between the fuel accumulator 6 and the cylinder head 21 as the biasing member 72 imparts a biasing force to the fuel accumulator 6 and the cylinder head 21. At this point, a position of the injector 7 relative to the fuel accumulator 6 and the cylinder head 21 is determined.

In this case, when the fuel accumulator 6 is fastened to the bracket 5 using the first fastening members 62 in a state where the injector 7 is held by the fuel accumulator 6 but the position of the injector 7 is not determined, there is a risk that, for example, a flexural load or the like may be applied to the injector 7 being directly connected to the fuel accumulator 6. When a flexural load or the like is applied to the injector 7, there is a risk that distortion in the injector 7 may occur. When distortion in the injector 7 occurs, an attitude of the injector 7 may deviate from a designed attitude and may affect a fuel injection amount. The fuel injection amount of the injector 7 affects performance of the engine 2 and exhaust performance. Therefore, the injector 7 is desirably assembled in a state where the designed attitude is maintained.

By comparison, in the fuel injection system 3 according to the present embodiment, the fuel accumulator 6 has the protruding portion 64 as represented in FIGS. 3 and 4. The protruding portion 64 constitutes a part of the "guide member" according to the present invention in a similar manner to the recessed portion 513 described earlier. In other words, the "guide member" according to the present invention has the protruding portion 64 and the recessed portion 513. The protruding portion 64 is formed so as to correspond to the recessed portion 513 and fits into the recessed portion 513. In other words, the recessed portion 513 is formed so as to correspond to the protruding portion 64 and is to be fitted by the protruding portion 64.

The protruding portion 64 may be provided on the fuel accumulator 6 or provided on the bracket 5. In other words, the protruding portion 64 is provided on one of the fuel accumulator 6 and the bracket 5. The recessed portion 513 may be provided in the fuel accumulator 6 or provided in the bracket 5. In other words, the recessed portion 513 is provided in the other of the fuel accumulator 6 and the bracket 5. In the example represented in FIGS. 3 and 4, the protruding portion 64 is provided on the fuel accumulator 6 and the recessed portion 513 is provided in the bracket 5.

For example, the protruding portion 64 is a pipe pin which fits into the recessed portion 513. In the example represented in FIGS. 3 and 4, the pipe pin as the protruding portion 64 is formed in a hollow rod shape with an inner diameter that enables, for example, a male screw of the first fastening member 62 to pass through. An outer circumferential surface on a side of one end of the protruding portion 64 is press-fitted into and fixed to the hole 63 (refer to FIG. 9) of the fuel accumulator 6 and an outer circumferential surface on a side of another end of the protruding portion 64 fits into the recessed portion 513 formed in the bracket 5. As described earlier, the bracket 5 may have the protruding portion 64. In this case, the outer circumferential surface on the side of one end of the protruding portion 64 is press-fitted into and fixed to the recessed portion 513 of the bracket 5 and the outer circumferential surface on the side of the other end of the protruding portion 64 fits into the hole 63 (in other words, a recessed portion) of the fuel accumulator 6. Hereinafter, a case where the fuel accumulator 6 has the protruding portion 64 and the bracket 5 has the recessed portion 513 will be described as an example.

Note that the protruding portion 64 is not limited to being a pipe pin. The protruding portion 64 need only have a shape that fits into the recessed portion 513 and may be a solid rod-shaped member. For example, the protruding portion 64 may be a sleeve or a collar. A vertical sectional shape of the protruding portion 64 is not particularly limited.

As represented in FIG. 3, in the fuel injection system 3 according to the present embodiment, the protruding portion 64 is provided in plurality. Specifically, as represented in FIG. 3, two protruding portions 64 are fixed to two holes 63 at both ends among the three holes 63 of the fuel accumulator 6. In addition, each of the two protruding portions 64 fits into each of the two recessed portions 513 formed in the bracket 5.

Note that in a similar manner to the case related to the recessed portion 513 described above, the protruding portions 64 are not limited to being fixed to the two holes 63 at both ends among the three holes 63 of the fuel accumulator 6 and need only be provided so as to correspond to the recessed portions 513. For example, the protruding portions 64 may be fixed to all of the three holes 63 of the fuel accumulator 6. In addition, in order to further improve guiding accuracy and positioning accuracy in a horizontal direction, the protruding portions 64 are desirably fixed by at least two holes 63 among the three holes 63 of the fuel accumulator 6. For example, the protruding portions 64 may be fixed to the central hole 63 and any of the holes 63 at both ends among the three holes 63 of the fuel accumulator 6.

As represented in FIG. 4, the protruding portions 64 are fixed to the holes 63 of the fuel accumulator 6 in a state where the protruding portions 64 protrude from a fastening surface 631 (refer to FIG. 9) of the fuel accumulator 6. In this case, when the injector 7 is inserted into the insertion hole 212 of the cylinder head 21 and mounted to the cylinder head 21, the protruding portion 64 starts to fit into the recessed portion 513 of the bracket 5 before the position of the injector 7 relative to the cylinder head 21 is determined. In the fuel injection system 3 according to the present embodiment, the position of the injector 7 relative to the cylinder head 21 is determined as the injector 7 is inserted into the insertion hole 212 of the cylinder head 21 and a positioning surface 71 of the injector 7 comes into contact with a positioning surface 214 of the cylinder head 21.

Specifically, as represented in FIG. 4, when the injector 7 is inserted into the insertion hole 212 of the cylinder head 21, a distance D1 between a tip portion 641 of the protruding portion 64 and a fastening surface 512 of the bracket 5 (in other words, an entrance surface of the recessed portion 513 of the bracket 5) is shorter than a distance D2 between the positioning surface 71 of the injector 7 and the positioning surface 214 of the cylinder head 21 (in other words, an entrance surface of the insertion hole 212 of the cylinder head 21). Therefore, when the injector 7 is inserted into the insertion hole 212 of the cylinder head 21, the protruding portion 64 starts to fit into the recessed portion 513 of the bracket 5 before the positioning surface 71 of the injector 7 comes into contact with the positioning surface 214 of the cylinder head 21. Accordingly, the protruding portion 64 and the recessed portion 513 can start guiding the injector 7 to the mount position on the cylinder head 21 before the position of the injector 7 relative to the cylinder head 21 is determined.

In addition, as described earlier, the recessed portion 513 has an inner circumferential surface that is parallel to the insertion direction of the injector 7 relative to the insertion hole 212 of the cylinder head 21. In other words, an axis of the recessed portion 513 is parallel to the insertion direction of the injector 7 relative to the insertion hole 212 of the cylinder head 21. Therefore, a direction in which the protruding portion 64 fits into the recessed portion 513 is parallel to the insertion direction of the injector 7 relative to the insertion hole 212 of the cylinder head 21. Therefore, a direction in which the fuel accumulator 6 is assembled and fixed to the bracket 5 is parallel to an insertion direction of the injector 7 relative to the insertion hole 212 of the cylinder head 21.

Accordingly, the fuel accumulator 6 proceeds parallel to the insertion direction of the injector 7 relative to the insertion hole 212 of the cylinder head 21 and is assembled and fixed to the bracket 5 while guiding the injector 7 to the mount position on the cylinder head 21 with the protruding portion 64 and the recessed portion 513. In this manner, due to the protruding portion 64 fitting into the recessed portion 513, the guide member having the protruding portion 64 and the recessed portion 513 can more reliably guide the injector 7 to the mount position on the cylinder head 21. In other words, when the fuel accumulator 6 is assembled to the bracket 5 and when the injector 7 is mounted to the cylinder head 21, the guide member having the protruding portion 64 and the recessed portion 513 is used as an insertion guide.

As described above, with the fuel injection system 3 according to the present embodiment, the fuel accumulator 6 which accumulates pressure of fuel supplied from a fuel pump is supported by and fixed to the bracket 5 which is fixed to the cylinder head 21 of the engine 2. In addition, the injector 7 which injects the fuel supplied from the fuel accumulator 6 into the combustion chamber 215 (refer to FIGS. 7 and 8) of the engine 2 is directly connected to the fuel accumulator 6 and also mounted to the cylinder head 21. In this case, at least one of the fuel accumulator 6 and the bracket 5 (in the present embodiment, both the fuel accumulator 6 and the bracket 5) has a guide member (the protruding portion 64 and the recessed portion 513) which guides the injector 7 to a mount position on the cylinder head 21. Therefore, when the fuel accumulator 6 is assembled and fixed to the bracket 5, even in a state where a position of the injector 7 relative to the cylinder head 21 is not determined, the fuel accumulator 6 guides the injector 7 to the mount position on the cylinder head 21 with the protruding portion 64 and the recessed portion 513 while being assembled and fixed to the bracket 5. Accordingly, when the fuel accumulator 6 is assembled and fixed to the bracket 5 and when the injector 7 is mounted to the cylinder head 21, the fuel injection system 3 according to the present embodiment can prevent a flexural load or the like from being applied to the injector 7 being connected to the fuel accumulator 6 and an occurrence of distortion in the injector 7 can be suppressed.

In addition, since the fuel accumulator 6 guides the injector 7 to the mount position on the cylinder head 21 with the protruding portion 64 and the recessed portion 513 while being assembled and fixed to the bracket 5, a dedicated jig and a special tool are not required. Accordingly, the fuel injection system 3 according to the present embodiment can prevent the number of steps from increasing in an assembly process of the fuel accumulator 6 with respect to the bracket 5 and an assembly process of the injector 7 with respect to the cylinder head 21. In addition, the fuel injection system 3 according to the present embodiment can eliminate the need for a dedicated jig and a special tool during after-sales service and maintenance in the market.

Furthermore, due to the protruding portion 64 fitting into the recessed portion 513, the guide member having the protruding portion 64 and the recessed portion 513 can more reliably guide the injector 7 to the mount position on the cylinder head 21. In other words, when the fuel accumulator 6 is assembled to the bracket 5 and when the injector 7 is mounted to the cylinder head 21, the guide member having the protruding portion 64 and the recessed portion 513 is used as an insertion guide. Therefore, when the fuel accumulator 6 is assembled and fixed to the bracket 5, even in a state where a position of the injector 7 relative to the cylinder head 21 is not determined, the fuel accumulator 6 can more reliably guide the injector 7 to the mount position on the cylinder head 21 with the protruding portion 64 and the recessed portion 513. Accordingly, when the fuel accumulator 6 is assembled and fixed to the bracket 5 and when the injector 7 is mounted to the cylinder head 21, the fuel injection system 3 according to the present embodiment can further prevent a flexural load or the like from being applied to the injector 7 being connected to the fuel accumulator 6 and an occurrence of distortion in the injector 7 can be further suppressed.

In addition, a direction in which the protruding portion 64 fits into the recessed portion 513 is parallel to the insertion direction of the injector 7 relative to the insertion hole 212 of the cylinder head 21. Therefore, a direction in which the fuel accumulator 6 is assembled and fixed to the bracket 5 is parallel to an insertion direction of the injector 7 relative to the insertion hole 212 of the cylinder head 21. Therefore, the fuel accumulator 6 proceeds parallel to the insertion direction of the injector 7 relative to the insertion hole 212 of the cylinder head 21 and is assembled and fixed to the bracket 5 while guiding the injector 7 to the mount position on the cylinder head 21 with the protruding portion 64 and the recessed portion 513. Accordingly, when the fuel accumulator 6 is assembled and fixed to the bracket 5 and when the injector 7 is mounted to the cylinder head 21, the fuel injection system 3 according to the present embodiment can further prevent a flexural load or the like from being applied to the injector 7 being connected to the fuel accumulator 6 and an occurrence of distortion in the injector 7 can be further suppressed.

In addition, the guide member has a plurality of protruding portions 64 and a plurality of recessed portions 513. Each of the plurality of protruding portions 64 fits into each of the plurality of recessed portions 513. Therefore, when the fuel accumulator 6 is assembled to the bracket 5 and when the injector 7 is mounted to the cylinder head 21, the plurality of protruding portions 64 and the plurality of recessed portions 513 are used as insertion guides at a plurality of positions. As a result, the fuel accumulator 6 is assembled and fixed to the bracket 5 while guiding the injector 7 to the mount position on the cylinder head 21 at a plurality of positions with the plurality of protruding portions 64 and the plurality of recessed portions 513. Accordingly, the fuel injection system 3 according to the present embodiment can further prevent a flexural load or the like from being applied to the injector 7 being connected to the fuel accumulator 6 and an occurrence of distortion in the injector 7 can be further suppressed without using a dedicated jig and a special tool.

In addition, when the injector 7 is mounted to the cylinder head 21, the protruding portion 64 and the recessed portion 513 can start guiding the injector 7 to the mount position on the cylinder head 21 before the position of the injector 7 relative to the cylinder head 21 is determined. Accordingly, when the fuel accumulator 6 is assembled and fixed to the bracket 5 and when the injector 7 is mounted to the cylinder head 21, the fuel injection system 3 according to the present embodiment can further prevent a flexural load or the like from being applied to the injector 7 being connected to the fuel accumulator 6 and an occurrence of distortion in the injector 7 can be further suppressed.

Furthermore, since the injector 7 is directly connected to the fuel accumulator 6, an occurrence of pressure loss of fuel is suppressed and the number of components including a fuel pipe and a bracket for fixing the injector can be reduced. In this case, the bracket 5 which supports the fuel accumulator 6 to which the injector 7 is directly connected has first fixing portions 51 which mesh with the first fastening members 62, second fixing portions 52, each of which having a hole 521 through which each of the second fastening members 59 passes, and the first reinforcing portion 541 which connects and reinforces one of the first fixing portions 51 and one of the second fixing portions 52 that are adjacent to each other, and the bracket 5 is formed in a ladder shape or a grid shape. Accordingly, the fuel injection system 3 according to the present embodiment can reinforce a fixing structure of the fuel accumulator 6 and the injector 7 using the bracket 5 which is formed in a ladder shape or a grid shape. Since strength of the fixing structure of the fuel accumulator 6 and the injector 7 is increased by the bracket 5 formed in a ladder shape or a grid shape, vibration that occurs in the fuel injection system 3 can be reduced. In addition, since the vibration that occurs in the fuel injection system 3 can be reduced, noise that occurs in the fuel injection system 3 can be reduced. Accordingly, the fuel injection system 3 according to the present embodiment can suppress an occurrence of pressure loss of fuel, reduce the number of components, and reduce vibration and noise.

In addition, the bracket has the first reinforcing portion 541 which connects and reinforces one of the first fixing portions 51 and one of the second fixing portions 52 that are adjacent to each other, the second reinforcing portion 542 which connects and reinforces the first fixing portions 51 that are adjacent to each other, and the third reinforcing portion 543 which connects and reinforces the second fixing portions 52 that are adjacent to each other, and the bracket 5 is formed in a ladder shape or a grid shape. Therefore, strength of the fixing structure of the fuel accumulator 6 and the injector 7 is further increased. As a result, the vibration that occurs in the fuel injection system 3 can be further reduced. In addition, since the vibration that occurs in the fuel injection system 3 can be further reduced, noise that occurs in the fuel injection system 3 can be further reduced. Accordingly, the fuel injection system 3 according to the present embodiment can suppress an occurrence of pressure loss of fuel, reduce the number of components, and further reduce vibration and noise.

In addition, the first fastening members 62 pass through holes 63 formed in the fuel accumulator 6 from above and mesh with the first fixing portions 51 of the bracket 5. The second fastening members 59 pass through the holes 521 formed in the second fixing portions 52 of the bracket 5 from above and mesh with the cylinder head 21. Therefore, when carrying out work to assemble and fix the bracket 5 to the cylinder head 21, a worker can pass the second fastening members 59 through the holes 521 from above and cause the second fastening members 59 to mesh with the cylinder head 21 and readily fasten the bracket 5 to the cylinder head 21. In addition, when carrying out work to assemble and fix the fuel accumulator 6 to which the injector 7 is directly connected to the bracket 5, the worker can pass the first fastening members 62 through the holes 63 of the fuel accumulator 6 from above and cause the first fastening members 62 to mesh with the first fixing portions 51 of the bracket 5 and readily fasten the fuel accumulator 6 to which the injector 7 is directly connected to the bracket 5. Accordingly, the fuel injection system 3 according to the present embodiment can facilitate assemblability and improve workability.

In addition, the sleeve 211 which determines an insertion position of the injector 7 relative to the insertion hole 212 to which the injector 7 is to be inserted is press-fitted into the insertion hole 212 of the cylinder head 21. Therefore, the sleeve 211 can more accurately determine a position of the injector 7 and, at the same time, suppress a rotation of the sleeve 211 itself in the insertion hole 212. Accordingly, the fuel injection system 3 according to the present embodiment can improve durability and reliability of the injector 7.

Figure 6:
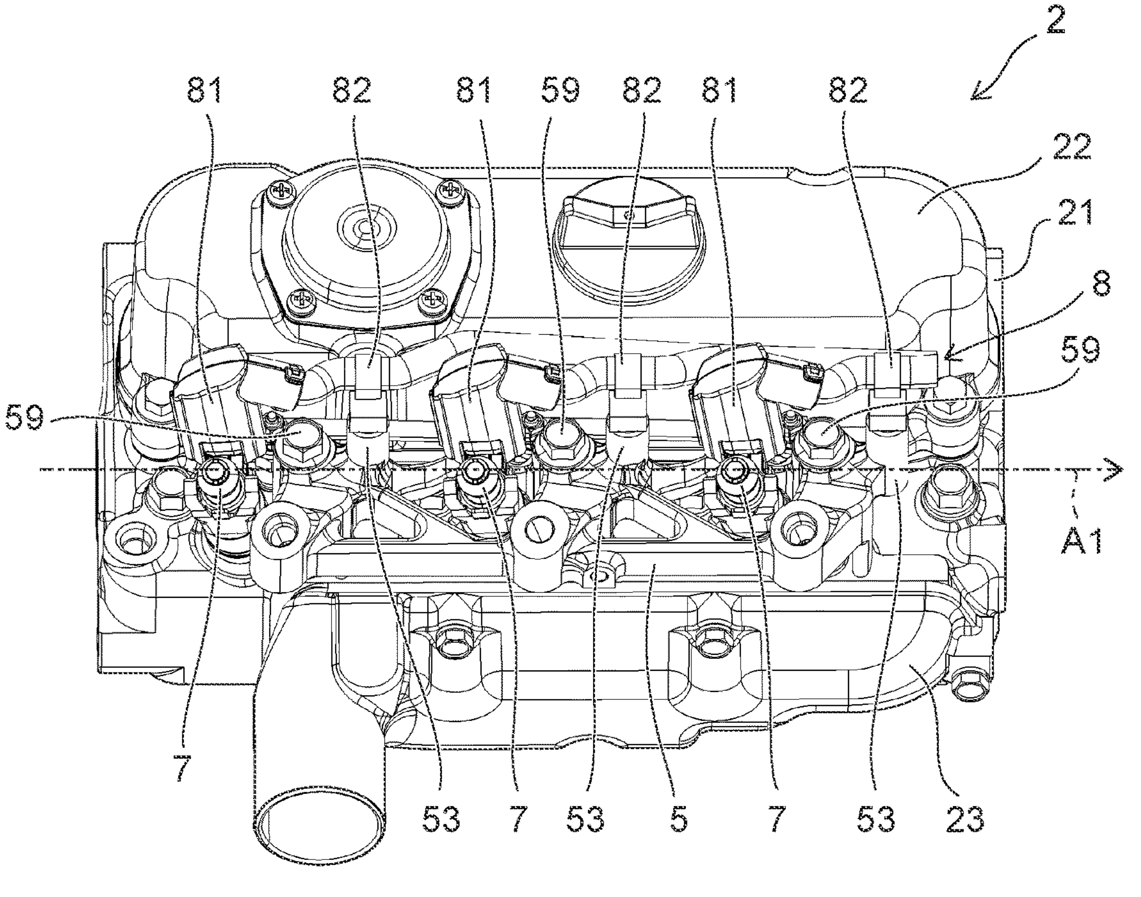
FIG. 6 is a perspective view when viewing the fuel injection system according to the present embodiment from obliquely above.

FIG. 6 is a perspective view when viewing the fuel injection system according to the present embodiment from obliquely above.

As described earlier regarding FIGS. 1 and 2, the harness 8 is connected to the injector 7 in the connecting portion 81 that is referred to as a coupler or the like and is fixed to the bracket 5 via the holding member 82. As represented in FIG. 6, the harness 8 is fixed to the third fixing portion 53 of the bracket 5 at a position adjacent to the connecting portion 81. Specifically, the harness 8 is extended along the array direction A1 of the plurality of injectors 7 and fixed to the third fixing portion 53 of the bracket 5 at a position between a plurality of injectors 7 that are adjacent to each other.

When an injector-driving harness is fixed to, for example, the head cover 22 (refer to FIG. 1) or the fuel pipe 61, there is a risk that vibration of the cylinder head 21, the fuel pipe 61, or the like may be transmitted to the harness and vibration of the harness may become amplified. When vibration of the harness is amplified, durability of the harness may decrease or noise may become amplified. In addition, when the injector-driving harness is fixed to a stay for fixing the harness or the like, the number of components increases.

By comparison, with the fuel injection system 3 according to the present embodiment, the harness 8 (in other words, an injector-driving harness) is connected to the injector 7 and fixed to the bracket 5. As described earlier regarding FIGS. 1 and 2, the bracket 5 is fixed to the cylinder head 21. In addition, the fuel accumulator 6 is fixed to the bracket 5 being fixed to the cylinder head 21 and is directly connected to the injector 7. For this reason, a portion where the harness 8 is connected to the injector 7 and a portion where the harness 8 is fixed to the bracket form a same vibration system via the bracket 5, the fuel accumulator 6, and the injector 7. Accordingly, the fuel injection system 3 according to the present embodiment can suppress vibration of the injector-driving harness 8. In addition, since the vibration of the harness 8 is suppressed, the fuel injection system 3 according to the present embodiment can suppress breaking or degradation in the connecting portion 81 of the harness 8, suppress a decline in durability of the harness 8, and suppress amplification of noise. Furthermore, instead of being fixed to a special component for fixing a harness, the harness 8 is fixed to the bracket 5 which supports the fuel accumulator 6. Therefore, the fuel injection system 3 according to the present embodiment can suppress vibration of the injector-driving harness 8 while preventing the number of components from increasing.

In addition, the harness 8 is fixed to the bracket 5 at a position adjacent to the connecting portion 81 being connected to the injector 7. Therefore, the portion where the harness 8 is fixed to the bracket 5 can support the harness 8 at a position that is close to the connecting portion 81 between the harness 8 and the injector 7. Accordingly, the fuel injection system 3 according to the present embodiment can further suppress vibration of the injector-driving harness 8.

Furthermore, the harness 8 is extended along the array direction A1 of the plurality of injectors 7 and fixed to the bracket 5 at a position between a plurality of injectors 7 that are adjacent to each other. Therefore, the portion where the harness 8 is fixed to the bracket 5 can support the harness 8 at a position that is close to the connecting portion 81 between the harness 8 and the injector 7 among the harness 8 that extends along the array direction A1 of the plurality of injectors 7. Accordingly, the fuel injection system 3 according to the present embodiment can further suppress vibration of the injector-driving harness 8.

Furthermore, the holding member 82 which holds the harness 8 is mounted to the bracket 5 and fixes the harness 8 to the bracket 5. Therefore, the harness 8 is not only fixed to the bracket 5 more reliably but also fixed to the bracket 5 with a simple structure. Accordingly, the fuel injection system 3 according to the present embodiment can more reliably fix the harness 8 to the bracket 5 with the holding member 82 and suppress vibration of the harness 8 while preventing the number of components from increasing.

FIG. 7 is a top view representing an arrangement relationship between the bracket and the cylinder head according to the present embodiment.

FIG. 8 is a top view representing the cylinder head according to the present embodiment.

As described earlier regarding FIGS. 1 and 2, the bracket 5 is fixed to the upper part of the cylinder head 21 using the second fastening member 59. At this point, as represented in FIG. 7, the bracket 5 is placed on the upper part of the cylinder head 21 so as to straddle over the combustion chamber 215 provided in the cylinder head 21. In the example represented in FIG. 7, the second fixing portion 52 and the third reinforcing portion 543 of the bracket 5 straddle over the combustion chamber 215 provided in the cylinder head 21. However, a portion of the bracket 5 to straddle the combustion chamber 215 is not limited to the second fixing portion 52 and the third reinforcing portion 543.

As represented in FIG. 8, the cylinder head 21 has a placement surface 216. The bracket 5 is placed on the placement surface 216 of the cylinder head 21 and fixed to the cylinder head 21. As represented in FIG. 8, the placement surface 216 is provided in a region that straddles over the combustion chamber 215 provided in the cylinder head 21. For example, the combustion chamber 215 represented in FIGS. 7 and 8 is an auxiliary chamber (in other words, an auxiliary combustion chamber) provided inside the cylinder head 21.

As described earlier regarding FIGS. 1 to 6, each of the injectors 7 is mounted to the upper part of the cylinder head 21. In addition, the fuel accumulator 6 and the fuel pipe 61 are provided at a position separated upward from the cylinder head 21. Therefore, when the bracket 5 is non-existent, a relatively large space is to exist in an upper part of and above the cylinder head 21. As a result, combustion noise that is generated in the combustion chamber 215 may leak out more easily above the cylinder head 21.

By comparison, with the fuel injection system 3 according to the present embodiment, the bracket 5 which supports the fuel accumulator 6 is placed on the upper part of the cylinder head 21 so as to straddle over the combustion chamber 215 of the engine 2 and is fixed to the upper part of the cylinder head 21. In this manner, since the bracket 5 is placed on and fixed to the upper part of the cylinder head 21 in a state of straddling over the combustion chamber 215 of the engine 2, combustion noise that is generated in the combustion chamber 215 of the engine 2 can be prevented from leaking above the cylinder head 21. In addition, the bracket 5 supporting the fuel accumulator 6 functions as a heavy object that is fixed to the upper part of the cylinder head 21 and exhibits an attenuation effect in a portion being fixed to the cylinder head 21. Therefore, the bracket 5 has a function of blocking combustion noise that is generated in the combustion chamber 215 of the engine 2 or, in other words, a noise reduction function. Accordingly, the fuel injection system 3 according to the present embodiment can reduce combustion noise that is generated in the combustion chamber 215 of the engine 2.

In addition, when the combustion chamber 215 is an auxiliary chamber formed inside the cylinder head 21, the bracket 5 positioned directly above the auxiliary chamber can prevent combustion noise that is generated in the auxiliary chamber from leaking above the cylinder head 21. Furthermore, the bracket 5 supporting the fuel accumulator 6 functions as a heavy object that is fixed to the upper part of the cylinder head 21 and exhibits an attenuation effect in the portion being fixed to the cylinder head 21. Therefore, the bracket 5 has a function of blocking combustion noise that is generated in the auxiliary chamber or, in other words, a noise reduction function. Accordingly, in the case where the combustion chamber 215 is an auxiliary chamber formed inside the cylinder head 21, the fuel injection system 3 according to the present embodiment can efficiently reduce combustion noise that is generated in the auxiliary chamber of an indirect injection engine.

In addition, the cylinder head 21 has the placement surface 216 on which the bracket 5 is placed. Therefore, the fuel injection system 3 according to the present embodiment can prevent distortion from occurring in the bracket 5 when the bracket 5 is assembled and fixed to the cylinder head 21 and enables the bracket 5 to be fixed to the upper part of the cylinder head 21 in a stable manner. Furthermore, the fuel injection system 3 according to the present embodiment can improve assemblability of the bracket 5 with respect to the upper part of the cylinder head 21. In addition, when the combustion chamber 215 is an auxiliary chamber formed inside the cylinder head 21, the placement surface 216 of the cylinder head 21 is provided in a region that straddles over the auxiliary chamber which is provided in the cylinder head 21 of an indirect injection engine. Therefore, the bracket 5 is placed on the placement surface 216 provided in a region that straddles over the auxiliary chamber in a state of straddling over the auxiliary chamber and the bracket 5 is fixed to the upper part of the cylinder head 21 in a stable manner. Accordingly, the bracket 5 can suppress transmission of vibration that is generated by combustion inside the auxiliary chamber to above the cylinder head 21. Accordingly, in the case where the combustion chamber 215 is an auxiliary chamber formed inside the cylinder head 21, the fuel injection system 3 according to the present embodiment can reduce combustion noise that is generated in the auxiliary chamber and reduce vibration that is generated by combustion in the auxiliary chamber.

Figure 9:
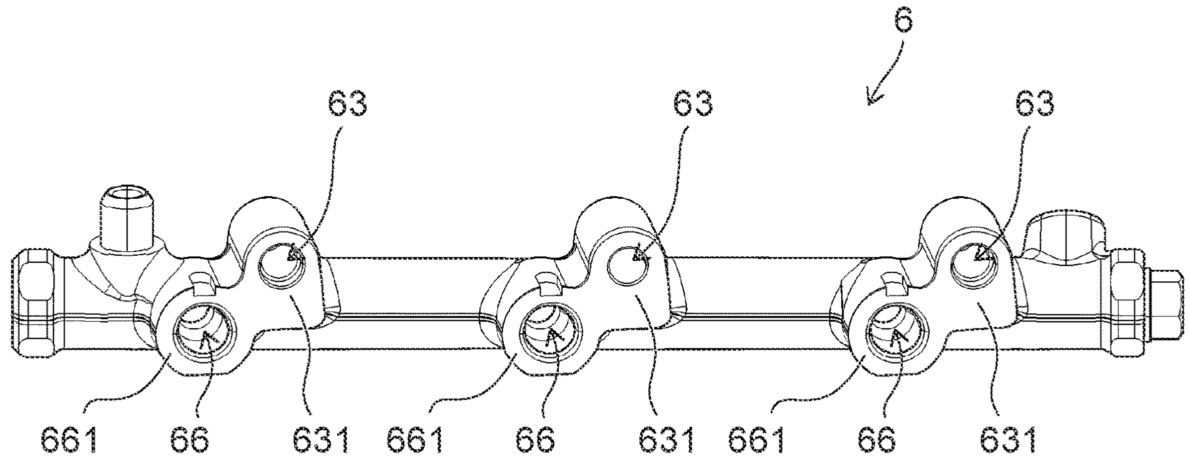
FIG. 9 is a perspective view when viewing a fuel accumulator according to the present embodiment from obliquely below.

FIG. 9 is a perspective view when viewing the fuel accumulator according to the present embodiment from obliquely below.

Note that the protruding portion 64 that is press-fitted into and fixed to the hole 63 has been omitted for convenience of description in FIG. 9.

As described above regarding FIGS. 3 and 4, the protruding portion 64 (not illustrated in FIG. 9) is press-fitted into and fixed to the hole 63 of the fuel accumulator 6. The fastening surface 631 is provided around the hole 63. The fastening surface 631 is a surface that comes into contact with the fastening surface 512 (refer to FIG. 4) of the bracket 5 when the fuel accumulator 6 is fastened to the bracket 5 using the first fastening members 62.

In addition, the injector 7 (not illustrated in FIG. 9) is inserted into the insertion hole 66 of the fuel accumulator 6 and directly connected to the fuel accumulator 6. An end of the injector 7 is liquid-tightly inserted into the insertion hole 66 and held by, for example, an O ring mounted to the injector 7. Accordingly, the injector 7 injects fuel supplied through the insertion hole 66 of the fuel accumulator 6 into the combustion chamber 215. A positioning surface 661 is provided around the insertion hole 66. The positioning surface 661 is a surface which comes into contact with the biasing member 72 mounted to the injector 7 and which determines a position of the injector 7.

As represented in FIG. 9, the fastening surface 631 formed around the hole 63 is a same surface as the positioning surface 661 formed around the insertion hole 66. Accordingly, the fuel injection system 3 according to the present embodiment can facilitate assemblability, improve workability, and fix the fuel accumulator 6 to which the injector 7 is directly connected to the bracket 5 in a stable manner.

An embodiment of the present invention has been described above. However, the present invention is not limited to the embodiment described above and various modifications can be made without deviating from the scope of claims. A part of the components of the embodiment described above may be omitted or combined in any way so as to differ from the combination described above.

REFERENCE SIGNS LIST

- 2 Engine
- 3 Fuel injection system
- 5 Bracket
- 6 Fuel accumulator
- 7 Injector
- 8 Harness
- 21 Cylinder head
- 22 Head cover
- 23 Intake manifold
- 51 First fixing portion
- 52 Second fixing portion
- 53 Third fixing portion
- 59 Second fastening member
- 61 Fuel pipe
- 62 First fastening member
- 63 Hole
- 64 Protruding portion
- 66 Insertion hole
- 71 Positioning surface
- 72 Biasing member
- 81 Connecting portion
- 82 Holding member
- 211 Sleeve
- 212 Insertion hole
- 213 Female screw
- 214 Positioning surface
- 215 Combustion chamber
- 216 Placement surface
- 511 Female screw
- 512 Fastening surface
- 513 Recessed portion
- 521 Hole
- 531 Hole
- 541 First reinforcing portion
- 542 Second reinforcing portion
- 543 Third reinforcing portion
- 631 Fastening surface
- 641 Tip portion
- 661 Positioning surface
- 821 Projecting portion
- A1 Array direction
- D1, D2 Distance

The invention claimed is:

1. A fuel injection system injecting fuel into a combustion chamber of an engine, the fuel injection system comprising: a bracket which is fixed to a cylinder head of the engine; a fuel accumulator which is supported by and fixed to the bracket and which accumulates pressure of the fuel supplied from a fuel pump; an injector which has a cylindrical shape extending in an injector axis, is directly connected to the fuel accumulator in a manner of being allowed to shift along the injector axis with respect to the fuel accumulator so that a position of the injector relative to the fuel accumulator is not determined, and is configured to be mounted to the cylinder head and which injects the fuel, supplied from the fuel accumulator, into the combustion chamber wherein the injector has a proximal end and a distal end in the injector axis, the proximal end facing the fuel accumulator and the distal end facing the cylinder head, and a biasing member which is configured to generate a biasing force due to a deformation of the biasing member and attached to the injector at a side of the proximal end of the injector, wherein the fuel accumulator is fixed to the bracket by using first fastening members, wherein the injector axis of the injector is arranged in the same orientation as the first fastening members such that the injector shifts in the same direction as the first fastening members in correspondence with a movement of the fuel accumulator, the bracket is fixed to the cylinder head by using second fastening members, the bracket has first fixing portions which mesh with the first fastening members, second fixing portions each having a hole through which each of the second fastening members passes, and a reinforcing portion which connects and reinforces the first fixing portions and the second fixing portions that are adjacent to each other, and the bracket is formed in a ladder shape or a grid shape, the injector passes through gaps formed in the bracket which is formed in the ladder shape or the grid shape, and the injector is mounted to the cylinder head by the distal end of the injector being inserted into an insertion hole formed in the cylinder head when the fuel accumulator is fastened to the bracket using the first fastening members, the biasing member is deformed by being pressed by the fuel accumulator such that the biasing force, which is generated due to the deformation of the biasing member, presses the injector toward the cylinder head such that the position of the injector relative to the fuel accumulator is determined and the injector is sandwiched between the fuel accumulator and the cylinder head.

2. The fuel injection system according to claim 1, wherein the reinforcing portion is a first reinforcing portion, and the bracket further includes a second reinforcing portion which connects and reinforces the first fixing portions that are adjacent to each other and a third reinforcing portion which connects and reinforces the second fixing portions that are adjacent to each other.

3. The fuel injection system according to claim 1, wherein the first fastening members pass through, from above, holes formed in the fuel accumulator and mesh with the first fixing portions, and the second fastening members pass through, from above, the holes formed in the second fixing portions and mesh with the cylinder head.

4. The fuel injection system according to claim 1, wherein a fastening surface which comes into contact with the bracket and which is fastened in the fuel accumulator is a same surface as a positioning surface which comes into contact with the injector and which determines a position of the injector in the fuel accumulator.

5. The fuel injection system according to claim 1, wherein at least one of the fuel accumulator and the bracket has a guide member which guides the injector to a mount position on the cylinder head.

6. The fuel injection system according to claim 5, wherein the guide member has a protruding portion provided on one of the fuel accumulator and the bracket, and a recessed portion which is provided on the other of the fuel accumulator and the bracket and into which the protruding portion fits.

7. The fuel injection system according to claim 6, wherein a direction in which the protruding portion fits into the recessed portion is parallel to a direction of the injection axis in which the injector is inserted into the insertion hole.

8. The fuel injection system according to claim 7, wherein the cylinder head has a sleeve which is press-fitted into the insertion hole and which determines a position of insertion of the injector into the insertion hole.

9. The fuel injection system according to claim 6, wherein the guide member has the protruding portion in plurality and the recessed portion in plurality such that each of the plurality of recessed portions is fitted by each of the plurality of protruding portions.

10. The fuel injection system according to claim 6, wherein when the injector is mounted to the cylinder head, the protruding portion starts to fit into the recessed portion before a position of the injector relative to the cylinder head is determined.

* * * * *